July 1, 1952      W. VAN DER WILT      2,602,007

AXLE HOUSING, BRACE ASSEMBLY

Filed June 8, 1950

Inventor,

Wein Van Der Wilt;

By Frederick E. Maynard,

Attorney.

Patented July 1, 1952

2,602,007

UNITED STATES PATENT OFFICE 2,602,007

AXLE HOUSING BRACE ASSEMBLY

Wein Van Der Wilt, Glendale, Calif.

Application June 8, 1950, Serial No. 166,856

2 Claims. (Cl. 301—129)

This invention is a brace assembly for the stiffening of rear axle housings of axles of road vehicles.

It is known that housings of the type in which drive axles of self-propelled vehicles are journalled tend to bow downward under the kinetic energy therein when the vehicle wheels strike a dip or other obstacle. This action results in a noticeable chafing around the axle-side of the rear tires.

An aim of this invention is to provide an extremely simple, reliable, effective and practical brace assembly to saddle the gear box of the housing. A further object is to provide a brace clamp which is light in weight and of but two primary parts, and which clamp requires but a couple of nuts to effect the clamping thereof in place on a portion of the housing.

Additionally, a purpose of the invention is to provide a housing clamp characterized by the combination of an inverted U-bolt and a one-piece housing seat providing for attachment of a tensioning rod.

The invention resides in certain advancements in this art as set forth in the ensuing disclosure and has, with the above, additional objects and advantages as hereinafter developed, and whose constructions, combinations and details of means and the manner of operation will be made manifest in the following description of the herewith illustrated embodiment; it being understood that modification, variations, adaptations and equivalents may be resorted to within the scope, spirit and principles of the invention as it is claimed in conclusion hereof.

Figure 1:
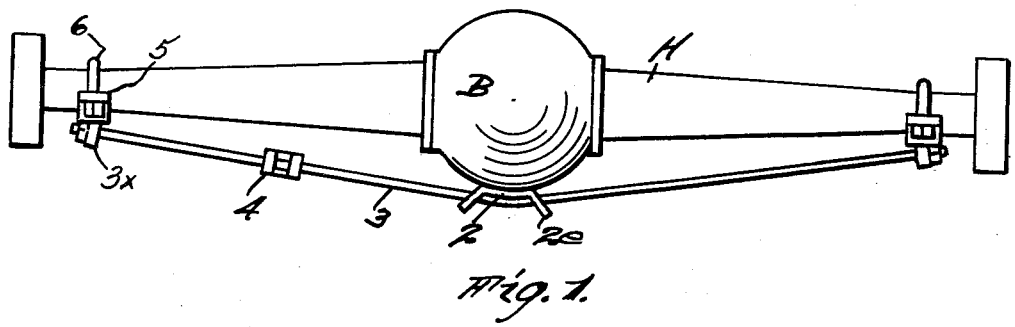
Figure 1 is a side elevation of the brace as it is applied to an axle housing.
Figure 3:
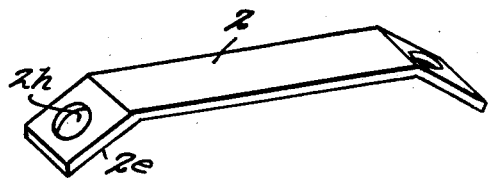
Figure 3 is a perspective of the gear box saddle.
Figure 2:
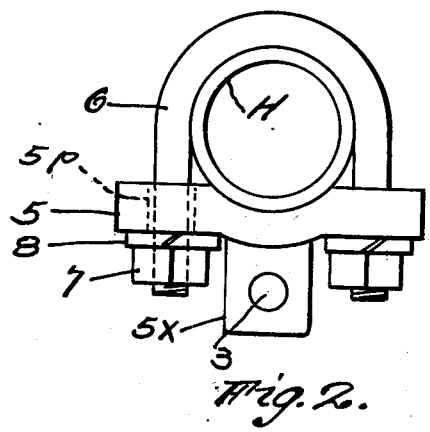
Figure 2 is an end view of the housing and side view of its applied brace clamp.

The conventional housing H has a central gear box B, and reduced outer ends for attachment of chassis make-up.

It is desired to reduce or to stop downward flexure of the box loaded portion of the housing, and the brace of this invention provides for that function by including a suitable saddle 2 fitting the bottom of the box B. Piercing the saddle is an elongate sectional rod 3 having a suitable number of turnbuckles 4.

On the opposite ends of the housing H are fixed clamp devices each of which includes transverse housing bed 5 having a medial, concave seat receiving the near bottom surface of the housing. An integral boss 5x on the bottom of the bed 5 receives the near end of the rod 3 having an abutting head or nut 3x outwardly of the boss.

The end portions of the bed have through holes one of which is indicated by dotted lines 5p into which pass the downwardly extending limbs of an inverted U-bolt 6 which straddles the housing. Clamp nuts 7 when clamped up against spring washers 8 will effectively tighten the clamp parts on the housing.

After the clamps have been tightly set, the turnbuckle may be rotated in the usual manner on the thereto connected sections of the rod 3 to tension the rod to the desired degree to sustain the box B of the housing when it tends to spring downward.

The saddle 3 preferably consists of a normally flat strip of stiff metal having downwardly bent ends 2e with holes 2h for the rod 3. When the saddle is set up against the bottom of the box B as the rod in the holes 2h is tensioned the saddle is clamped securely up against the box and the flexing of the saddle, as Fig. 1, causes the edges of the holes 2h to cut into and bind the rod.

What is claimed is:

1. A rear axle housing brace including a pair of seat members having top surface concave portions to generally fit a given axle housing and having laterally extending coplanar lugs which are perforated from top to bottom, and said members being adapted to be placed transversely onto the bottom of the housing; in combination with a U-bolt adapted to straddle the housing and whose legs extend through the perforations of the respective lugs of said members, nuts on the legs of the bolts whereby to clamp the said members and their bolts on the housing, a tension rod connected at its ends to the said members and having a saddle part to support the box of the housing, said saddle part including perforated end portions with biting lips to receive and bind on the rod.

2. In an axle housing brace assembly of the kind disclosed, a gear box saddle adapted to receive a gear box part of the housing, and consisting of a strip of stiff metal arched to fit the housing and having outwardly divergent bent down end portions with holes to receive a tensioning rod; the edges of said holes operating to bind onto the rod when it is placed under tension while the saddle is clinched up against the bottom of the said box.

WEIN VAN DER WILT.

REFERENCES CITED

The following references are of record in the file of this patent:

UNITED STATES PATENTS

| Number | Name | Date |
|---|---|---|
| 692,162 | Mandt | Jan. 28, 1902 |
| 1,153,996 | Brocksmith | Sept. 21, 1915 |
| 1,172,111 | Christiansen | Feb. 15, 1916 |
| 1,705,381 | Snyder | Mar. 12, 1929 |
| 1,970,560 | Goebert | Aug. 21, 1934 |